United States Patent [19]

Ling

[11] Patent Number: 5,752,834
[45] Date of Patent: May 19, 1998

[54] MOTION/FORCE SIMULATORS WITH SIX OR THREE DEGREES OF FREEDOM

[76] Inventor: Shou Hung Ling, Winnepeg, Canada

[21] Appl. No.: 563,093

[22] Filed: Nov. 27, 1995

[51] Int. Cl.$^6$ .................................................. G09B 9/08
[52] U.S. Cl. ........................................ 434/58; 434/55
[58] Field of Search .............................. 434/29, 30, 55, 434/57, 58, 62; 472/59, 130

[56] References Cited

U.S. PATENT DOCUMENTS

| | | | |
|---|---|---|---|
| 4,343,610 | 8/1982 | Chou | 434/58 |
| 5,018,973 | 5/1991 | Alet et al. | 434/62 |
| 5,366,375 | 11/1994 | Sarnicola | 434/58 X |

FOREIGN PATENT DOCUMENTS

| | | | |
|---|---|---|---|
| 2703175 | 9/1994 | France | 434/30 |
| 94/10665 | 5/1994 | WIPO | 434/30 |

*Primary Examiner*—Jeffrey A. Smith
*Attorney, Agent, or Firm*—Adrian D. Battison; Murray E. Thrift

[57] ABSTRACT

This invention relates to parallel mechanisms and, to be more specific, mechanical devices consisting of plates connected together by several legs. The 6 degrees of freedom variable leverage motion simulator, shown in FIG. 1, basically an in-parallel actuated robotic platform with three serial subchains, features a novel design that can provide 6 degrees of freedom motion capability. Two simplified versions, shown in FIG. 3 and FIG. 5, can provide selective 3 degrees of freedom motion. The designs also exploit the use of various pickup points which make them very easy to adapt to different actuators and to provide different leverages. Potential energy storage devices can be installed to the pickup points as a safety feature and to reduce the payload of actuators. The preferred embodiments of this invention may be used, among other things, as a motion/force simulator for flight simulation, driving simulation or object interaction and telepresence issues in virtual reality environments.

28 Claims, 7 Drawing Sheets

MOTION/FORCE SIMULATORS WITH SIX OR THREE DEGREES OF FREEDOM

This invention relates to a motion/force simulator.

Previous arrangements are known as the Stewart platform which is shown in the drawings herein and described hereinafter. In addition, alternative arrangements are shown in U.S. Pat. Nos. 4,343,610 (Chou) and 4,651,589 (Lambert). None of these has the advantages as set out hereinafter.

According to a first aspect of the present invention there is provided a motion simulator comprising:

a first member defining a first plane;

a second member defining a second plane;

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuator means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a second joint having only a single axis of rotation of said leg relative to said second member with the single axes arranged such that each lies on a respective one of three lines with each respective line being inclined to the second plane.

According to a second aspect of the invention there is provided a motion simulator comprising:

a first member defining a first plane;

a second member defining a second plane;

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuator means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a rotary actuator for effecting rotation of the leg about an axis of rotation of said leg relative to said second member with the axes arranged such that each lies on a respective one of three lines with each respective line being inclined to the second plane.

According to a third aspect of the invention there is provided a motion simulator comprising:

a first member defining a first plane;

a second member defining a second plane;

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuator means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a second joint having only a single axis of rotation of said leg relative to said second member;

wherein each leg comprises a first leg portion and a second leg portion, the first leg portion being connected to the first joint and the second leg portion being connected to the second joint and the first leg portion being connected to the second leg portion by pivot connecting means allowing pivotal movement of the first leg portion relative to the second leg portion about a pivot axis parallel to the respective line, and wherein there is provided means for extending the leg comprising an actuator connected between the first and second leg portions for increasing the angle therebetween.

BRIEF DESCRIPTION OF THE DRAWINGS

It will be better understood from the following description given by way of example with reference to the accompanying drawings in which.

DETAILED DESCRIPTION

Figure 2:
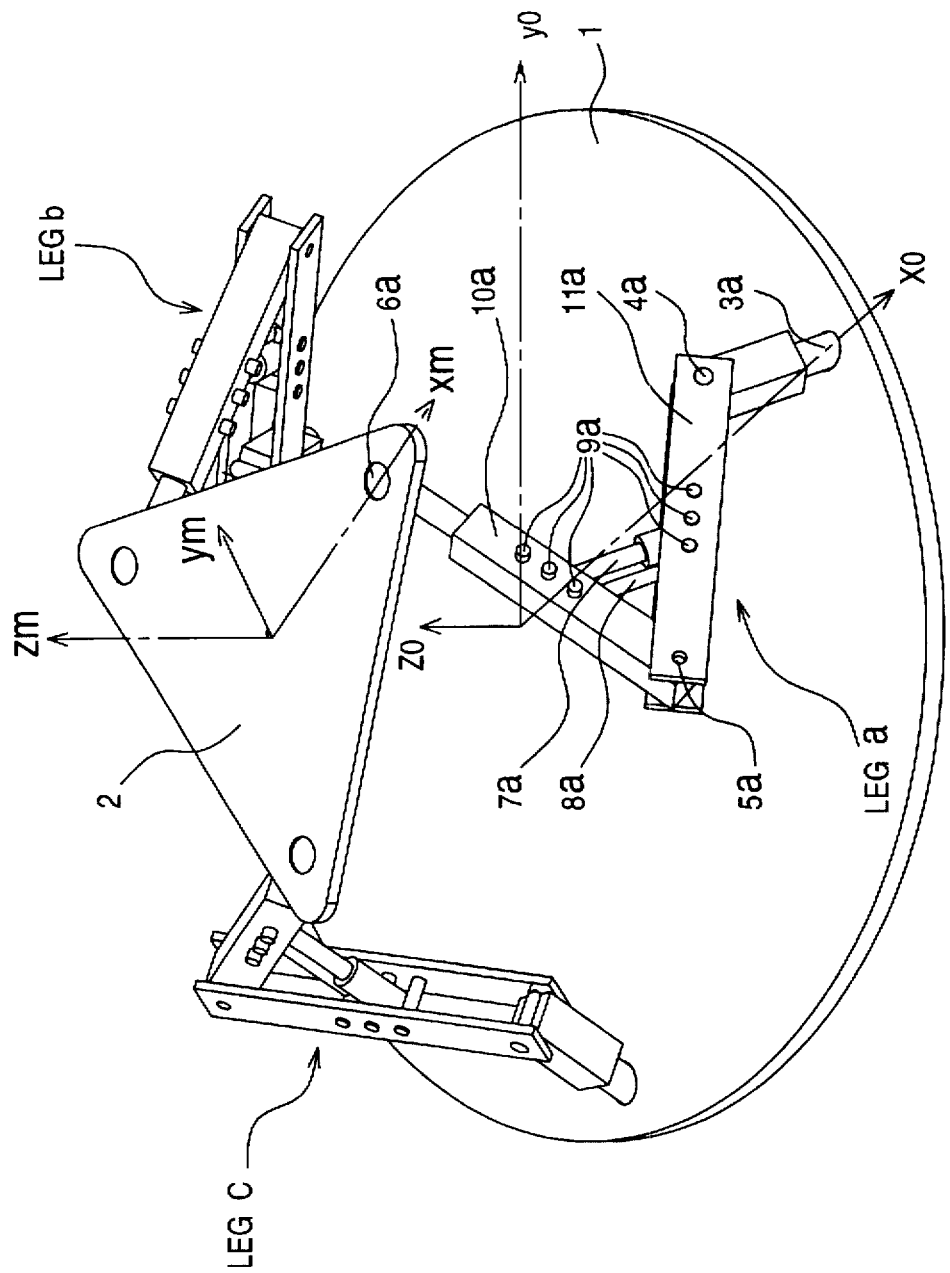
FIG. 2 is a schematic perspective view with notations of the motion simulator shown in FIG. 1.
Figure 4:
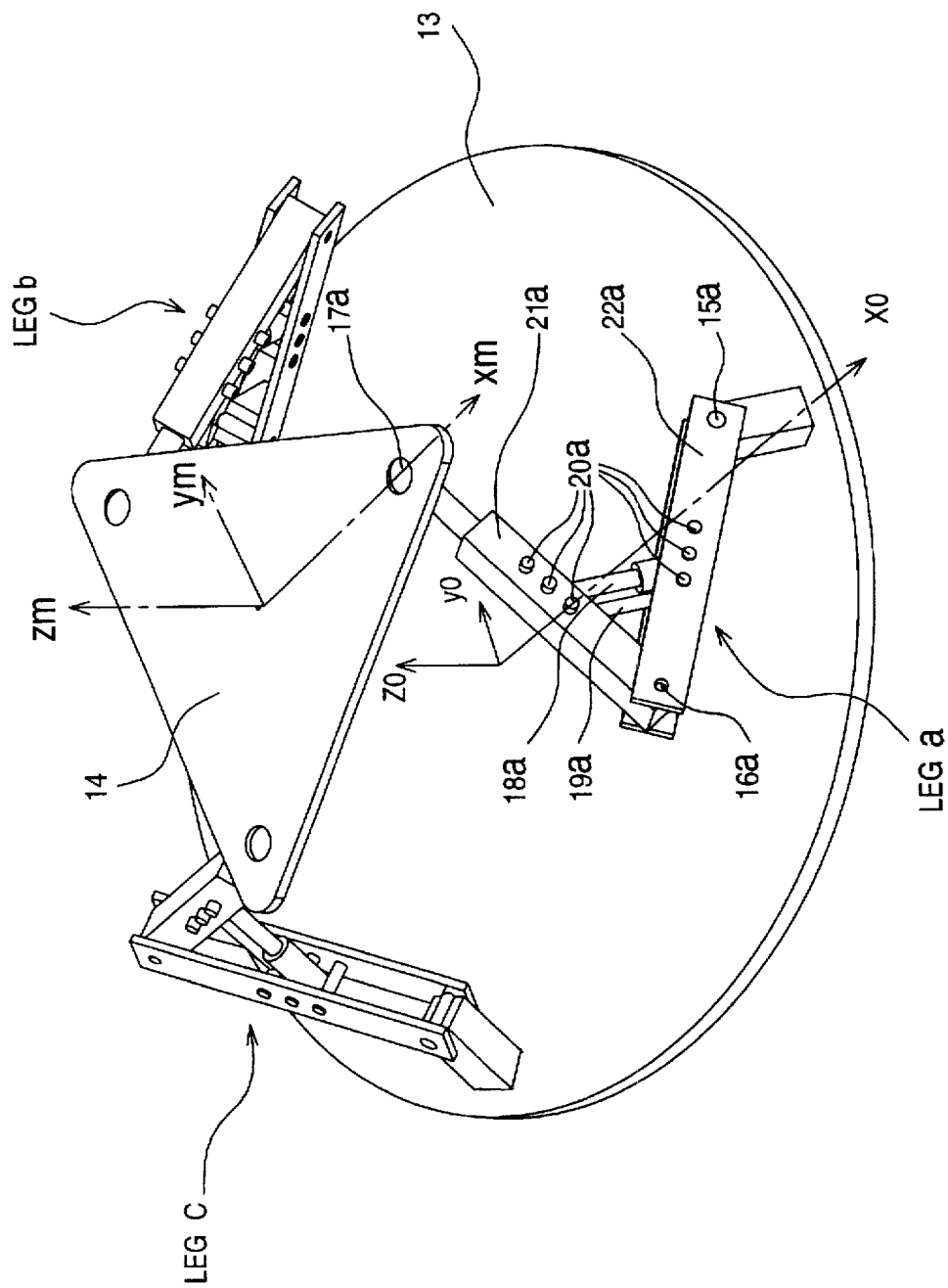
FIG. 4 is a schematic perspective view with notations of a motion simulator similar to that of FIG. 2 but simplified relative thereto.
Figure 5:
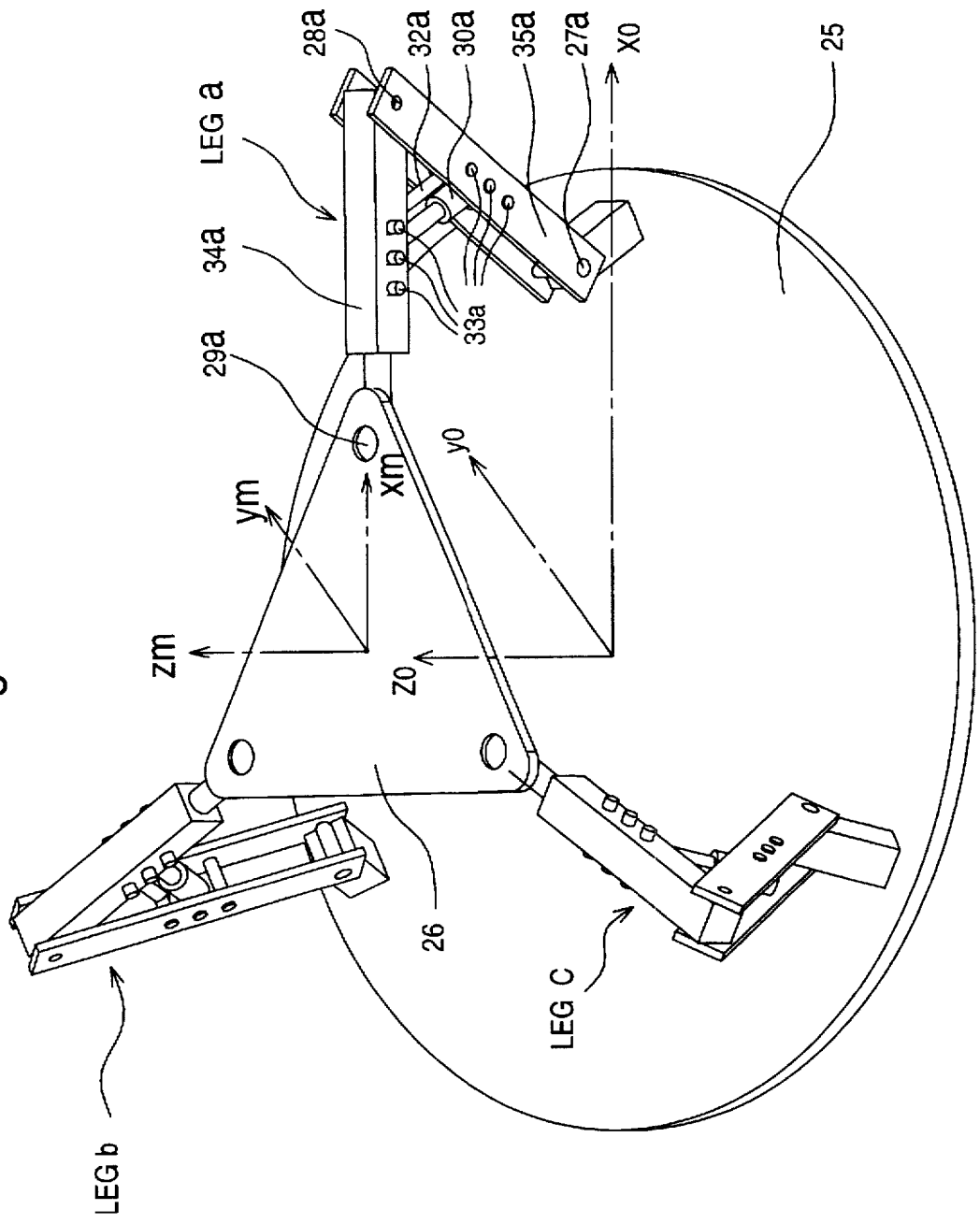
FIG. 5 is a schematic perspective view with notations of a second motion simulator similar to that of FIG. 2 but simplified relative thereto.

This invention, shown in FIG. 2, FIG. 4 and FIG. 5, relates to parallel mechanisms and, to be more specific, mechanical devices comprising two plates connected together by several legs acting in-parallel. The function of this invention, a 6 degree-of-freedom motion/force simulator and two simplified 3 degree-of-freedom versions, is to serve as a direct 'seat-to-the-pants' man-machine interface in interactive simulation applications.

Figure 7:
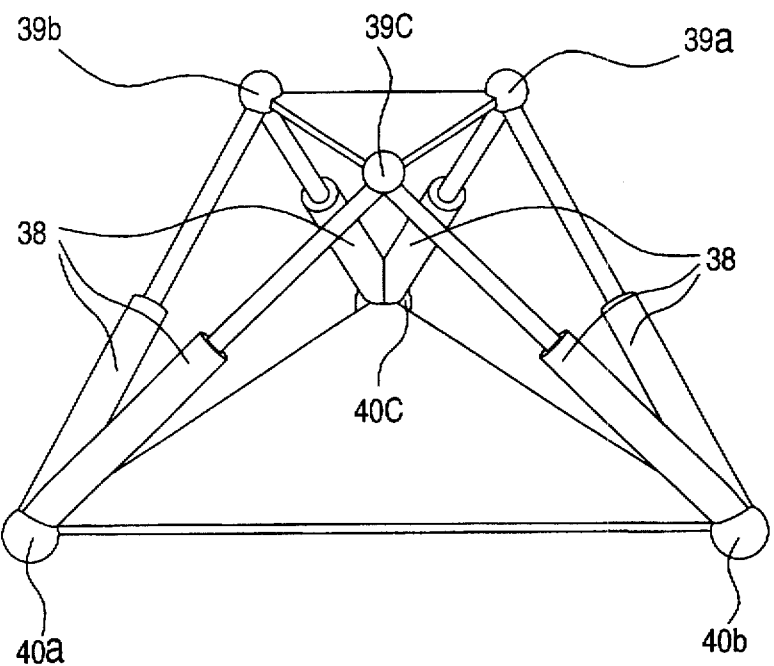
FIG. 7 is a schematic drawing of the 3—3 Stewart platform motion simulator.
Figure 8:
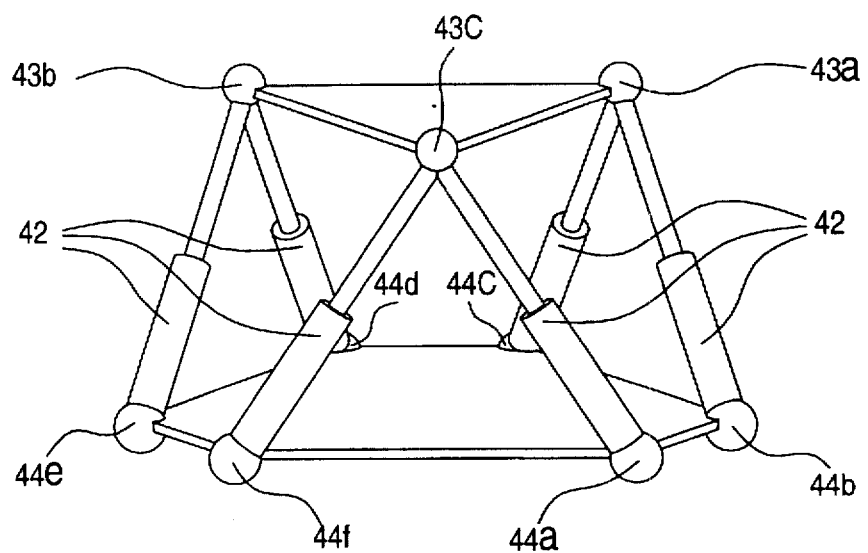
FIG. 8 is a schematic drawing of the 6-3 Stewart platform motion simulator.

One prior art parallel mechanism is known as a "Stewart platform". The Stewart platform was introduced in 1965 to be used as an aircraft simulator. A conventional Stewart platform, though many variations now exist, is essentially a 3-3 platform (FIG. 7) or a 6-3 platform (FIG. 8). The Stewart platforms, and its variations, are 6-degree-of-freedom, computer-controlled (position and force control) motion platform which consists of a moving plate supported by six linear actuators (e.g., hydraulic cylinders) shown as 38 in FIG. 7 or 42 in FIG. 8; each of these 'legs' is connected to the moving plate and the fixed base via a ball joint and a universal joint, respectively. The nomenclature "3-3" represents three points of connection on the base plate and three on the movable top plate, while "6-3" represents six points of connection on the base and three on the movable top plate.

In 3-3 Stewart platform, each pair of legs must be joined by a double spherical joint (39a or 39b or 39c) (that is, a pair of concentric ball and socket joints) at one end and a double universal joint (40a or 40b or 40c) at the other. It is a very difficult task to design either a double spherical joint or a double universal joint without unwanted interference between moving parts. For 6-3 Stewart platform, the complications at the joints on the base were eased by having six connecting points (44a, ... 44f), however, the complications at the double spherical joints (43a, 43b, 43c) on the movable top plate remained the same.

Figure 1:
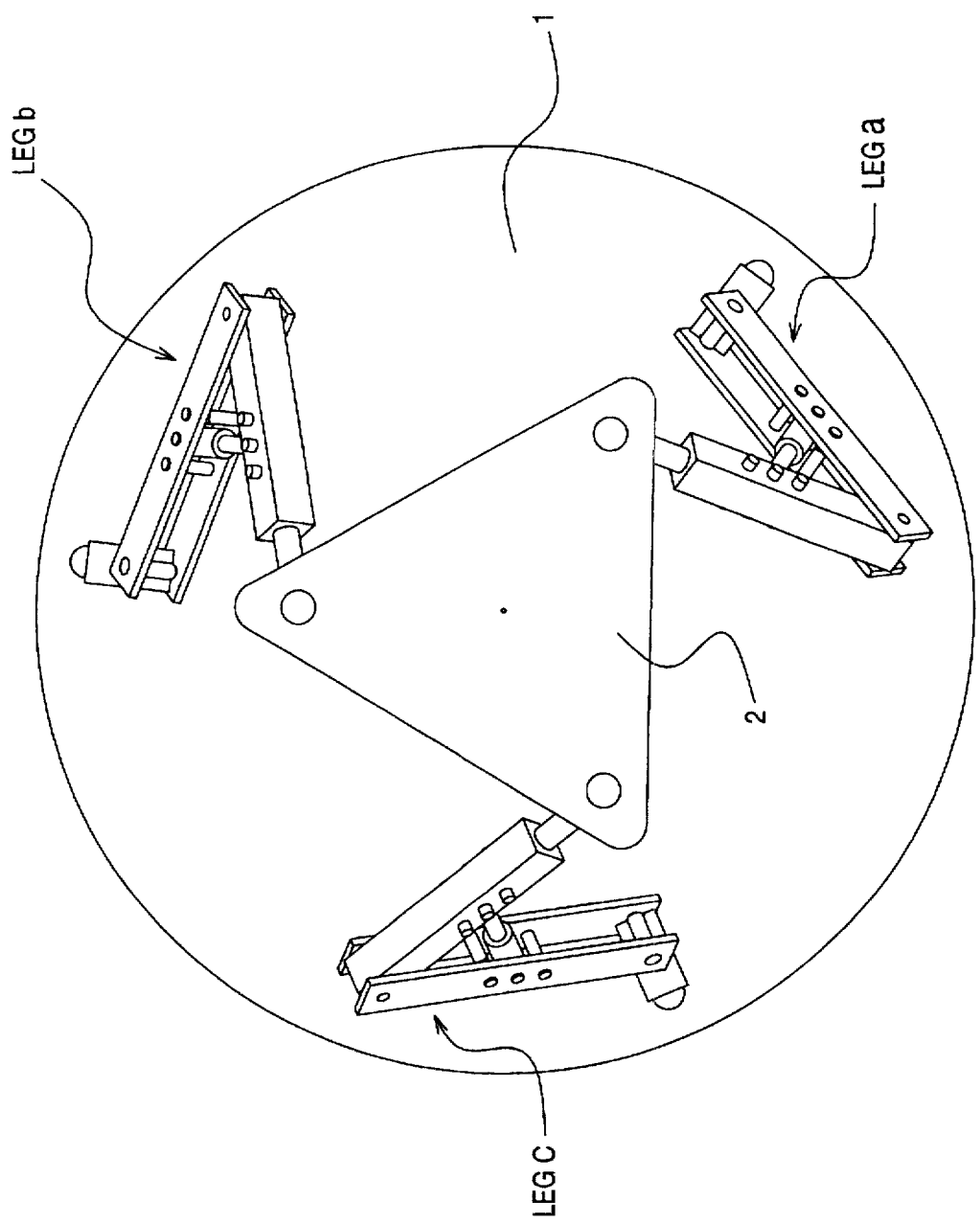
FIGS. 1 and 3 are top and side views of a 6 degrees of freedom motion/force simulator.
Figure 3:
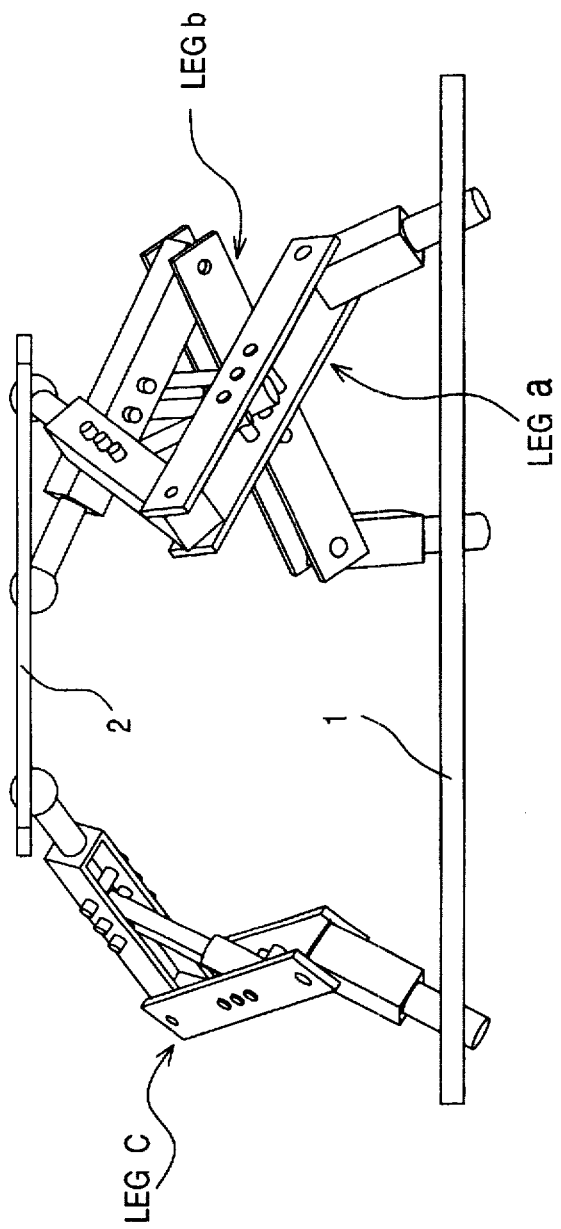

Although resulting in the geometrical complexities, 6-6 platforms have been developed to completely eliminate the need for coincident connection points. The 6-6 configuration has eliminated the need for double spherical or universal joint and is now the most widely employed type of platform motion simulator in the flight simulation industry. However, the geometrical complexities of the 6-6 configuration requires complicated controller and control algorithm in order to achieve adequate dynamic responses while meeting the demand of such high payload operations. In spite of the various type platform motion simulators, the complexities (either mechanical or geometrical) and the need of six custom-made actuators result in the fact that each motion simulation system costs about 10 million dollars. The price is too high for ordinary household and entertainment business to afford. I have found that in force/motion simulation applications, a 6 degree-of-freedom mechanical device (as shown in FIGS. 1, 2 and 3) can provide all the motions which a Stewart type 6 degree-of-freedom platform simulator can provide while using less powerful actuators (therefore cost less.). By carefully designing the positions and orientations of the joints and actuators in each leg, a simple and efficient control algorithm can be incorporated so that the programming and hardware of the platform's controller can be simplified drastically, therefore the cost of the whole force/motion simulation system can be further reduced. The whole force/motion simulation system, is intended to provide a comparable realism of a Stewart platform (or its variations) simulation system while cost only a fraction of it.

Figure 6:
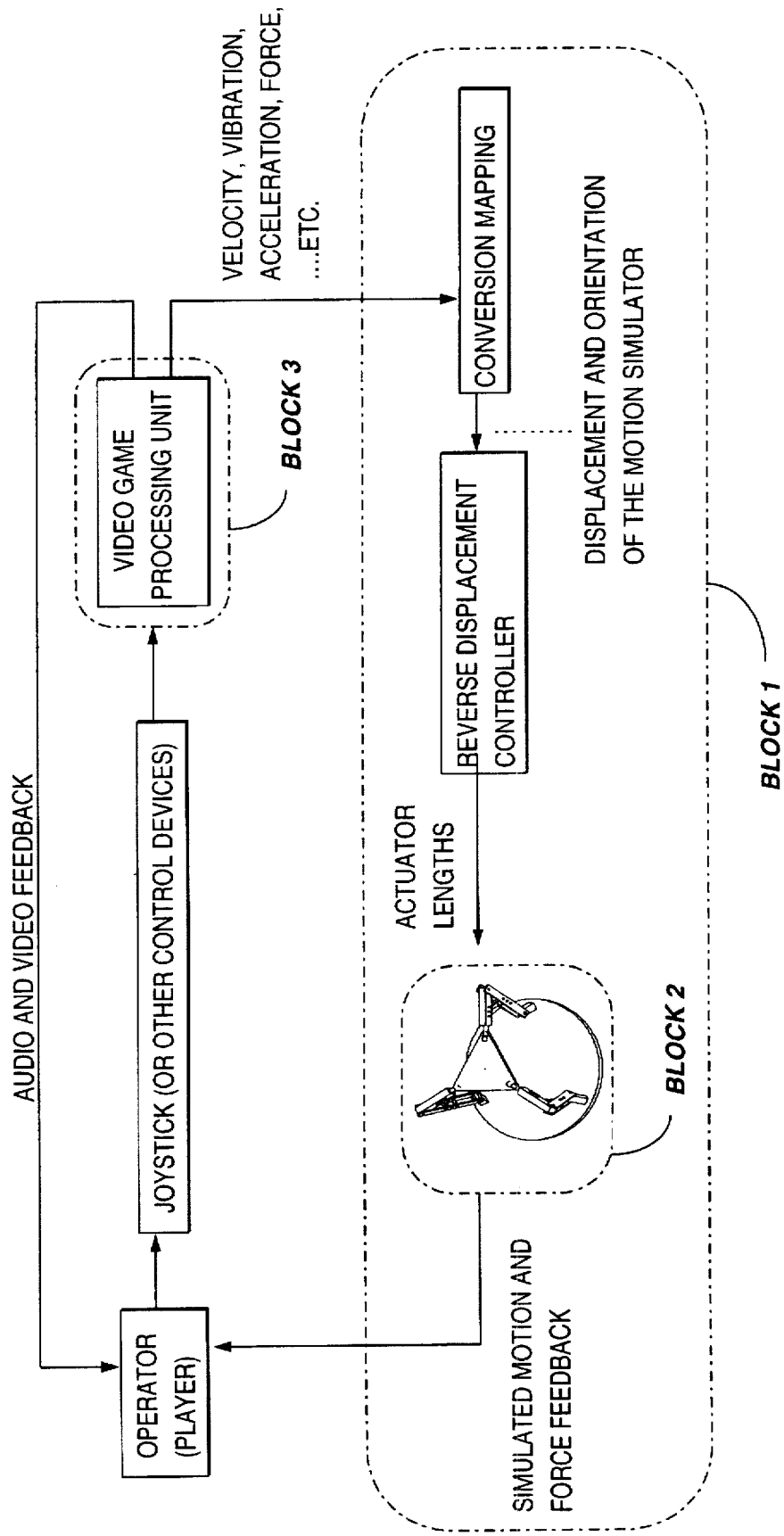
FIG. 6 is a relation scheme between the "Video Game Processing Unit" (BLOCK 3) the simulation system (BLOCK 1) and the 3 d.o.f. motion/force simulator (BLOCK 2).

Two simplified versions, both of which are 3 degree-of-freedom motion simulators, are also shown in FIG. 4 and FIG. 5. The simplified versions are intended to be used in simulation applications where cost is of bigger concern. For example, the simplified versions can be used as the mechanical device (shown as BLOCK 2 in FIG. 6) of a add-on motion/force simulation system (BLOCK 1 of FIG. 6) to nowadays "Video Game Processing Unit" (BLOCK 3 of FIG. 6). The simplified 3 d.o.f. (degree-of-freedom) versions and the 6 d.o.f. motion/force simulator have very similar structure. Therefore the 3 d.o.f. versions can be easily upgraded to the 6 d.o.f. version. Being able to upgrade is a very important feature of this invention.

A 6 Degree-of-Freedom Motion/Force Simulator

The 6 d.o.f. platform, shown in FIGS. 1, 2 and 3, takes on a geometry that is different from the conventional configuration. It consists of a moving top plate supported by three (not six) identical legs (a, b and c) with each of which being actuated via a rotary actuator and a linear actuator. In order to describe the motion and the design of this simulator later on, two imaginary coordinate systems are defined here: Referring to FIG. 2, a base Cartesian coordinate frame x0-y0-z0 is fixed at the base (1) with the z0 axis pointing vertically upward and the x0 axis pointing toward the rotary actuator (3a). Similarly, a coordinate frame xm-ym-zm zm is assigned to the upper plate (2), with the zm axis normal to the top plate and the xm axis pointing towards the ball joint 6a.

There are three identical legs (a, b and c) in this in-parallel platform and all of them are 6 degree-of-freedom serial chains. Each leg consists of a upper leg (10a) and a lower leg (11a). The upper leg and the lower leg are connected through a rotary joint (5a). The upper leg is connected to the top movable plate (2) through a spherical (ball) joint (or equivalence) (6a), while the lower leg is connected to the base via a rotary joint (4a) and a rotary actuator(3a). The linear actuator (7a) is mounted between the pickup joints (9a) in upper leg (10a) and lower leg (11a). The rotary actuator (3a) and linear actuator (7a) of each leg are powered and controlled and equipped with position sensors.

The rotary joints (5a, 5b, 5c) located between the upper and lower legs are designed parallel to (4a, 4b, 4c), while the rotary joints (4a, 4b, 4c) are perpendicular to the rotary actuators (3a, 3b, 3c) respectively. The directions of the rotary actuators (3a, 3b, 3c) are inclined toward with respect to the z0 axis at or about the angle of 30 degree. The inclination is necessary because of two reasons: First, the arrangement can reduce the payload requirement on the linear actuators (7a, 7b, 7c) by about 15%. Second, the design of inclination enables us to come up with different simplified 3 d.o.f. versions, which will be shown later, with different motion capabilities. With the aforementioned design parameters, this motion/force simulator can provide full 6 degree-of-freedom motion capability, namely the x-y-z translational movement as well as the roll-pitch-yaw orientational movement.

The inverse position kinematics (given the top plate's position and orientation, to calculate the actuators' angle/length) of this 6 d.o.f. simulator is comparably as easy as Stewart type platform. By knowing the top plate's position and orientation, one can know the position of ball joints (6a, 6b, 6c), and then calculate the required angle/length of the actuators to achieve the specific pose. For forward position kinematics (knowing the actuators' angle/length, (7a, 7b, 7c) to find the top plate's (2) position and orientation), it is suggested that 3 more position sensors can be added to the rotary joints (4a, 4b, 4c) in addition to the position sensors already equipped on all the actuators. If the angles of 3a, 4a, and the length of 7a are known, one can easily find the position of the ball joint 6a. The position of the ball joints 6b and 6c can be found by the same reasoning. After knowing the position of ball joints 6a, 6b and 6c, the position and orientation of the top plate can be easily calculated.

Potential energy storage devices (8a, 8b, 8c) (spring, compressed air spring, . . . etc.) can be installed to the pickup points (9a, 9b, 9c) which are not used by the actuators (7a, 7b, 7c). These devices can serve two purposes: First, the weight of the top plate (2) (and its attachment), at its idle position, will be balanced by the spring devices, so the actuators (7a, 7b, 7c) only have to induce the position change and produce the acceleration of the top plate (2), not the weight of it. Second, these devices are also a safety feature. If the electricity is accidentally disconnected during simulation operation, the potential energy storage devices (8a, 8b, 8c) will keep the simulator from collapse.

Kinematically speaking, each leg of this 6 d.o.f. motion/force simulator can be substituted by a single powered and controlled extensible member. In practice, nevertheless, the upper-lower leg design is a better one because of the following reasons:

1. The upper-lower legs will act as bending moment bearing structure. So the powered and controlled extensible members only have to provide the axial force, as they are designed to do.
2. If we use single powered and controlled linear actuators, the performance of the simulator will be directly affected by those actuators. For a given workspace and dynamic response of the simulator, it is more than likely that the actuators need to be custom-made, which will be very expensive. Using the upper-lower leg design will make the simulator adapted to a variety of actuators on the market. The positions of the pickup points can be adjusted to compensate the performance of the selected actuators and to suit different simulation environment.
3. The upper-lower leg design also make the installation of the potential energy device very easy.

Although we used the phases "top movable plate (2)" and "base plate (1)" throughout the above description, the top and bottom elements don't in fact have to be plates but can be any shape simply defining a plane in which the apexes of the triangle lie with that triangle defining the point of connection of the legs. The triangle defining the point of connection of the legs need not to be equilateral, although being equilateral is encouraged because most simulation environments are symmetric. By the same token, the inclination of the rotary actuators (3a, 3b, 3c) are not necessary to be the same although it is recommended.

Simplified Version I

The simplified version I, shown in FIG. 4, is essentially the same as the 6 d.o.f. version without the three rotary actuators at the bottom of each leg. Referring to Fig. 4, there are three identical legs (a, b and c) in this in-parallel platform and all of them are 5 degree-of-freedom serial chains. Each leg consists of a upper leg (21a) and a lower leg (22a). The upper leg (22a) and the lower leg (21a) are connected through a rotary joint (16a). The upper leg (21a) is connected to the top movable plate (14) through a spherical (ball) joint (or equivalence) (17a), while the lower leg (22a) is connected to the base (13) via a rotary joint (15a). A linear actuator (18a) is mounted between the pickup joints (20a) in upper leg (21a) and lower leg (22a). The linear actuator (18a) in each leg is powered and controlled and equipped with a position sensor.

The rotary joints (16a, 16b, 16c) located between the upper and lower legs are designed parallel to (15a, 15b, 15c) respectively. If the directions of the rotary joints (15a, 15b, 15c) are linearly independent, the roll, pitch yaw and combination thereof the top plate (14) can be controlled directly and easily. If the directions of the rotary joints (15a, 15b, 15c) are lying on the x0-y0 plane, therefore linearly dependent, the top plate (14) will have two rotational and one translational motional capability such as the case of Simplified Version II.

Through variating the length of each powered and controlled extensible member (18a, 18b, 18c), the top plate (14) can provide the movement of roll, pitch, yaw and combination thereof, therefore simulate the lateral acceleration force to a person sitting on the top plate. The upward (downward) acceleration sensation in the zm direction can be simulated through increasing (decreasing) the lengths of all the actuators (18a, 18b, 18c) at the same time in any pose.

The work space of the top plate is restricted by the length of the actuator and the mechanical limits of all the joints in each leg. As long as the top plate is within its work space, it will have full 3 degree-of-freedom orientational ability. Compare to the "motion simulator" by R. C. Chou, originally patented in U.S. Pat. No. 4,343,610, the design presented here can achieve the following motion sensation which can not be achieved by Chou's design:

1. Chou's 3 d.o.f. design can not achieve upward or downward acceleration sensation.
2. Chou's 4 d.o.f. design, FIG. 3 in U.S. Pat. No. 4,343, 610, generally can not achieve upward and downward acceleration sensation with respect to a person sitting on the top plate. (Chou's 4 d.o.f. design can achieve the vertical acceleration in the z0 direction, not the zm direction. To a person sitting on the top plate, it is zm that is the upward/downward acceleration direction). The Simplified Version I, with only 3 d.o.f. and three powered and controlled extensible members, can achieve the upward and downward acceleration sensation with respect to a person sitting on the top plate (i.e. the zm direction acceleration sensation).

Just as the aforementioned 6 d.o.f. version, the potential storage devices (19a, 19b, 19c) (spring or compressed air spring.. . .etc.) can be installed to the pick up points (20a, 20b, 20c) which are not used by the actuators (18a, 18b, 18c), in order to reduce the actuator's size and act as a safety feature.

Last but not the least, this 3 d.o.f. version can be upgraded to the full 6 d.o.f. motion/force simulator with the addition of three powered and controlled rotary actuators at the bottom of each leg. This upgradability can help customers save a lot of money to upgrade from a 3 d.o.f. system to a 6 d.o.f. system without buying a whole new simulator.

Simplified Version II

The simplified version 11, shown in FIG. 5, is a 3 degree-of-freedom simulator with different motion capability from the Simplified Version I. Referring to FIG. 5, there are three identical legs (a, b and c) in this in-parallel platform and all of them are 5 degree-of-freedom serial chains. Each leg consists of a upper leg (34a) and a lower leg (35a). The upper leg (34a) and the lower leg (35a) are connected through a rotary joint (28a). The upper leg (34a) is connected to the top movable plate (26) through a spherical (ball) joint (or equivalence) (29a), while the lower leg (35a) is connected to the base (25) via a rotary joint (27a). The linear actuator (30a) is mounted between the pickup joints (33a) in upper leg (34a) and lower leg (35a). The linear actuator (30a) of each leg is powered and controlled and equipped with a position sensor.

The rotary joints located between the upper and lower legs (28a, 28b, 28c) are designed parallel to (27a, 27b, 27c) respectively. Unlike the previous version, the rotary joints (27a, 27b, 27c) connecting the lower legs (35a) and base plate (25) are now lying on the same plane which is parallel to the base plate. Because of the aforementioned arrangement, the top plate (26) now has two degrees of freedom on orientation and one degree of freedom in the Cartesian position in z0 direction.

Same as Simplified Version I, the potential energy storage device (32a, 32b, 32c) will be installed to the pickup joints which are not used by the extensible actuators (30a, 30b, 30c) in order to reduce the actuators' size and act as a safety feature. Also like the Simplified Version I, this 3 d.o.f. version can be upgraded to the full 6 d.o.f. motion/force simulator with the addition of three powered and controlled rotary actuators at the bottom of each leg. This upgradability can help customers save a lot of money to upgrade from this 3 d.o.f. system to the 6 d.o.f. system without buying a whole new simulator.

Kinematically, all three of the aforementioned motion/force simulators can be inverted and still have the same motion capability.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A motion simulator comprising:

a first member defining a first plane;

a second member defining a second plane;

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuation means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a second joint having only a single axis of rotation of said leg relative to said second member with the single axis arranged such that the axis lies on a respective one of three lines with each respective line being inclined to the second plane at an angle of inclination.

2. The motion simulator according to claim 1 wherein the angle of inclination is equal for each of the lines.

3. The motion simulator according to claim 1 wherein the lines pass through a single point above the second triangle formed by the apex in the second plane.

4. The motion simulator according claim 3 wherein the projection of the single point onto the second plane is at the center of the second triangle.

5. The motion simulator according to claim 1 wherein each of the first and second triangles is equilateral.

6. The motion simulator according to claim 1 wherein each line is inclined relative to the second plane so as to extend away from the second plane and toward a point which lies above the center of the second triangle.

7. The motion simulator according to claim 6 wherein each line lies at an angle to the second plane lying in the range 20 to 40 degrees.

8. The motion simulator according to claim 1 wherein each leg comprises a first leg portion and a second leg portion, the first leg portion being connected to the first joint, the second leg portion being connected to the second joint by a coupling allowing pivotal movement of the second leg portion about a first pivot axis at right angles to the line, and the first leg portion being connected to the second leg portion by pivot connecting means allowing pivotal movement of the first leg portion relative to the second leg portion about a second pivot axis parallel to the first pivot axis, and wherein there is provided an actuator connected between the first and second leg portions for increasing the angle therebetween so as to extend the leg.

9. The motion simulator according to claim 8 wherein the actuator is a linear actuator.

10. The motion simulator according to claim 8 wherein the actuator is adjustable in position on the leg portions so as to increase and decrease the distance thereof from the coupling means and thus vary a mechanical advantage of the actuator on the leg.

11. The motion simulator according to claim 8 including a spring connected between the first leg portion and the second leg portion and arranged to support the first leg portion relative to the second leg portion at a predetermined angle such that the actuator acts to deviate the first leg portion and second leg portion from said predetermined angle against the bias of the spring.

12. A motion simulator comprising:

a first member defining a first plane;

a second member defining a second plane;

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuation means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a passive rotary joint allowing rotation of the leg about an axis of rotation of said leg relative to said second member with the axis of rotation of each of the legs arranged such that each axis lies on a respective one of three lines with each respective line being inclined to the second plane.

13. The motion simulator according to claim 12 wherein each leg comprises a first leg portion and a second leg portion, the first leg portion being connected to the first joint, the second leg portion being connected to the second joint by a coupling allowing pivotal movement of the second leg portion about a first pivot axis parallel to the line, and the first leg portion being connected to the second leg portion by pivot connecting means allowing pivotal movement of the first leg portion relative to the second leg portion about a second pivot axis parallel to the first pivot axis, and wherein there is provided an actuator connected between the first and second leg portions for increasing the angle therebetween so as to extend the leg.

14. The motion simulator according to claim 13 wherein the actuator is a linear actuator.

15. The motion simulator according to claim 13 wherein the actuator is adjustable in position on the leg portions so as to increase and decrease the distance thereof from the coupling means and thus vary a mechanical advantage of the actuator on the leg.

16. The motion simulator according to claim 13 including a spring connected between the first leg portion and the second leg portion and arranged to support the first leg portion relative to the second leg portion at a predetermined angle such that the actuator acts to deviate the first leg portion and second leg portion from said predetermined angle against the bias of the spring.

17. A motion simulator comprising:

a first member defining a first plane;

a second member defining a second plane;

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuation means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a second joint having only a single axis of rotation of said leg relative to said second member;

wherein each leg comprises a first leg portion and a second leg portion, the first leg portion being connected to the first joint, the second leg portion being connected to the second joint by a coupling allowing pivotal movement of the second leg portion about a first pivot axis, and the first leg portion being connected to the second leg portion by pivot connecting means allowing pivotal movement of the first leg portion relative to the second leg portion about a second pivot axis parallel to the first pivot axis, and wherein there is provided an actuator connected between the first and second leg portions for increasing the angle therebetween so as to extend the leg:

and wherein the actuator is adjustable in position on at least one of the first and second leg portions so as to increase and decrease the distance of the actuator from the second pivot axis and thus vary a mechanical advantage of the actuator on the leg.

18. The motion simulator according to claim 17 wherein the actuator is a linear actuator.

19. A motion simulator comprising:

a first member defining a first plane;

a second member defining a second plane:

one of the first and second members being arranged such that the plane thereof defines a reference plane and the other of the first and second members being arranged such that the plane thereof defines a simulator plane having at least three degrees of movement relative to the reference plane;

an actuation means for effecting movement of the first member relative to the second member to effect said movement of the simulator plane relative to the reference plane;

the actuation means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a second joint having only a single axis of rotation of said leg relative to said second member;

wherein each leg comprises a first leg portion and a second leg portion, the first leg portion being connected to the first joint, the second leg portion being connected to the second joint by a coupling allowing pivotal movement of the second leg portion about a first pivot axis, and the first leg portion being connected to the second leg portion by pivot connecting means allowing pivotal movement of the first leg portion relative to the second leg portion about a second pivot axis parallel to the first pivot axis, and wherein there is provided an actuator connected between the first and second leg portions for increasing the angle therebetween so as to extend the leg;

and a spring connected between the first leg portion and the second leg portion and arranged to support the first leg portion relative to the second leg portion at a predetermined angle such that the actuator acts to deviate the first leg portion and second leg portion from said predetermined angle against a bias of the spring.

20. A motion simulator comprising;

a first member defining a first plane;

a second member defining a second plane;

one of the first and second members being arranged such that the plane thereof defines a reference plane and the other of the first and second members being arranged such that the plane thereof defines a simulator plane having six degrees of movement relative to the reference plane;

an actuation means for effecting movement of the first member relative to the second member to effect said movement of the simulator plane relative to the reference plane;

the actuation means comprising three legs each connected between the first member and the second member;

first connecting means connecting each of the legs to the first member with the first connecting means being arranged at the apexes of a first triangle in the first plane;

second connecting means connecting each of the legs to the second member with the second connecting means being arranged at the apexes of a second triangle in the second plane;

each of the legs being extendible to increase and decrease a length thereof between the first and second connecting means;

said first connecting means of each leg comprising a first joint defining three axes of rotation of said leg relative to said first member;

said second connecting means of each leg comprising a second joint having a rotary actuator defining an axis of rotation of said leg relative to said second member with the axis of rotation arranged such that the axis of rotation lies on a respective one of three lines with each respective line being inclined to the second plane each leg comprising a first leg portion and a second leg portion, the first leg portion being connected to the first joint, the second leg portion being connected to the second joint by a coupling allowing pivotal movement of the second leg portion about a first pivot axis at right angles to the line, and the first leg portion being connected to the second leg portion by pivot connecting means allowing pivotal movement of the first leg portion relative to the second leg portion about a second pivot axis parallel to the first pivot axis, and wherein there is provided an actuator connected between the first and second leg portions for increasing the angle therebetween so as to extend the leg.

21. The motion simulator according to claim 20 wherein the angle of inclination is equal for each of the lines.

22. The motion simulator according to claim 20 wherein the lines pass through a single point above the second triangle formed by the apexes in the second plane.

23. The motion simulator according to claim 22 wherein the projection of the single point onto the second plane is at the center of the second plane.

24. The motion simulator according to claim 20 wherein each of the first and second triangles is equilateral.

25. The motion simulator according to claim 20 wherein each line is inclined relative to the second plane so as to extend away from the second plane and toward a point which lies above the center of the second triangle.

26. The motion simulator according to claim 25 wherein each line lies at an angle to the second plane lying in the range 20 to 40 degrees.

27. The motion simulator according to claim 20 wherein the actuator is adjustable in position on the leg portions so as to increase and decrease the distance thereof from the coupling means and thus vary a mechanical advantage of the actuator on the leg.

28. The motion simulator according to claim 20 including a spring connected between the first leg portion and the second leg portion and arranged to support the first leg portion relative to the second leg portion at a predetermined angle such that the actuator acts to deviate the first leg portion and second leg portion from said predetermined angle against a bias of the spring.

* * * * *